(No Model.)
D. J. CARTWRIGHT & J. S. POTTER.
ELECTRIC CUT-OUT.
No. 443,068. 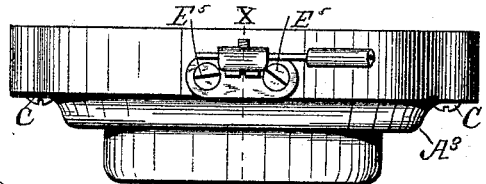 Patented Dec. 16, 1890.
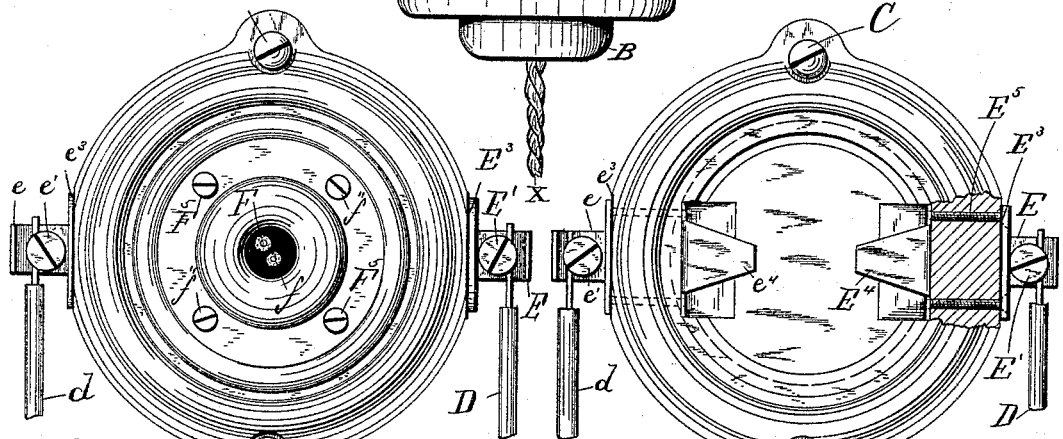
WITNESSES
INVENTORS.
David J. Cartwright
and
John S. Potter
by Alban Andrén
PER their ATTORNEY

UNITED STATES PATENT OFFICE.

DAVID J. CARTWRIGHT, OF BOSTON, AND JOHN S. POTTER, OF NEWTON, MASSACHUSETTS; SAID CARTWRIGHT ASSIGNOR TO SAID POTTER.

ELECTRIC CUT-OUT.

SPECIFICATION forming part of Letters Patent No. 443,068, dated December 16, 1890.

Application filed July 14, 1890. Serial No. 358,704. (No model.)

*To all whom it may concern:*

Be it known that we, DAVID J. CARTWRIGHT, a citizen of the United States, and a resident of Boston, in the county of Suffolk and State of Massachusetts, and JOHN S. POTTER, a citizen of the United States, and a resident of Newton, in the county of Middlesex and State of Massachusetts, have jointly invented new and useful Improvements in Electric Cut-Outs, of which the following, taken in connection with the accompanying drawings, is a specification.

This invention relates to improvements in electric cut-outs for the purpose of readily and conveniently attaching and detaching incandescent lamps to and from their circuit-wires. The invention is also constructed with a view of preventing water from entering and causing short-circuiting of the internal parts of the device, as will hereinafter be more fully shown and described, reference being had to the accompanying drawings, wherein—

Figure 1 represents a side elevation of the device when in use, and Fig. 2 represents a bottom view of the same. Fig. 3 represents a bottom view of the base-piece, to which the circuit-wires are connected, part of said figure being shown in section. Fig. 4 represents a central longitudinal section on the line X X, shown in Fig. 1. Fig. 5 represents a bottom view of the detachable rosette; and Fig. 6 represents a section on the line Y Y, shown in Fig. 5.

Similar letters refer to similar parts wherever they occur on the different parts of the drawings.

The device consists, essentially, of two parts, namely, a base-piece A, adapted to be secured to the ceiling of a room or building, and a detachable rosette B, as shown in the drawings, which parts are preferably made of porcelain or other suitable insulating material.

The base-piece A is preferably secured to the ceiling by means of screws C C going through perforated ears on the periphery of said base-piece, as shown in Figs. 1, 2, and 3. The base-piece A has a central cavity A', adapted to contain the metallic contact parts of said base and rosette, as will hereinafter be described. The cavity A' is inclosed by an annular rim A'', as shown, which rim has on its under side a downwardly-projecting annular lip or drip ring $A^3$ for the purpose of preventing any condensed moisture or water that may collect on the outside of the base-piece A from entering the central spaces of the base-piece and rosette, thus preventing short-circuiting of the mechanism contained within said spaces. The condensed moisture or water that may collect on the exterior of the base-piece A will be automatically conducted to the projecting ring $A^3$, from which it will drip without coming in contact with the rosette B, as fully shown in Figs. 2 and 4.

D and $d$ are the circuit-wires, as usual, the ends of which are metallicly connected to the respective metal brackets E $e$, secured opposite to each other on the outside of the base-piece A, as shown in Figs. 1, 2, 3, and 4. The wire D is preferably connected to the metal bracket E by means of a headed binder-screw E', and in practice we prefer to arrange on the bracket E, below the head of the screw E', a rivet, screw, or projection E'', opposite to the place where the screw E' pinches the wire D, so as to prevent the binder-screw E' from being bent or broken while screwed against the circuit-wire D.

Between the bracket E and the outside of the base A we prefer to locate a packing $E^3$, so as to still further prevent moisture or water from reaching the internal parts contained within the base and rosette. Opposite to the bracket E is arranged on the interior of the annular rim A'' a metal contact and locking plate $E^4$, which is secured in place and metallicly connected to the outer bracket E by means of headed metal screws $E^5$ $E^5$ passing loosely through perforations in the bracket E and rim A'', and having their inner ends screwed in screw-threaded perforations in the metal locking and contact plate $E^4$, as shown in Fig. 3. $e$, $e'$, $e''$, $e^3$, $e^4$, and $e^5$ $e^5$ represent similar and corresponding parts for the circuit-wire $d$, as shown in the drawings.

F and $f$ are the wires leading from and through the rosette B to the incandescent lamp, as usual, said wires having their upper ends metallicly connected, respectively, to the hooked contact and locking plates F' and $f'$, which are secured to the upper portion of the rosette B, preferably by means of screws F'' f'', passing loosely through perforations in the rosette and screwed in the said respective contact and locking plates F' and f'. In practice we prefer to arrange between the upper ends of said wires F f and their hooked locking and contact plates fusible wires for the purpose of preventing the wires from being burned out by abnormal currents, short-circuiting, or from any other cause. Such fusible wires are preferably arranged and connected as follows: The wire F is attached to a metal plate $F^3$, preferably by means of a binder-screw $F^4$. The metal plate $F^3$ is secured to the rosette B, preferably by means of a screw $F^5$, passing loosely through a perforation in the rosette B and screwed into said plate $F^3$, as shown.

$F^6$ is the fusible wire connected to the plate $F^3$ and locking-plate F'.

$f'$, $f''$, $f^3$, $f^4$, $f^5$, $f^6$, $f^7$, and $f^8$ represent similar and corresponding parts metallicly connected to the wire f, as shown.

If it is desired to connect the rosette to the base-piece it is only necessary to raise the rosette against the under side of the base-piece with the locking-plates F' f' placed to one side of the respective base-piece locking devices $E^4$ $e^4$, after which the rosette is turned about one-fourth of a revolution, causing the hooked locking-plates F f to pass above the base-piece locking-plates $E^4$ $e^4$, as shown in Fig. 4, by which the rosette and base-piece are held firmly locked together and an electrical connection established between the wires D d, through the electric cut-out and lamp-wires.

To liberate the rosette, it need only be turned about one-fourth in an opposite direction, causing the hooked contact-plates F' f' to be disengaged from the base-plate $E^4$ $e^4$ and allowing the rosette to be freely removed from the base-piece.

Having thus fully described the nature, construction, and operation of our invention, we wish to secure by Letters Patent, and claim—

1. An electric cut-out consisting of the base-piece A, having a cavity containing the metallic locking and contact pieces $E^4$ and $e^4$, the exterior metallic brackets E and e, and the metallic screws $E^5$ and $e^5$, securing the said brackets in place on the rim of the base-piece and extending through the latter into engagement with the interior metallic locking-plates for attaching and metallicly connecting said plates with the exterior brackets, substantially as described.

2. In an electric cut-out, the herein-described device for securing the circuit-wire to the base, consisting of a metal bracket E, binder-screw E', and rest projection E'', all arranged and combined substantially as and for the purpose set forth.

In testimony whereof we have signed our names to this specification, in the presence of two subscribing witnesses, on this 3d day of July, A. D. 1890.

DAVID J. CARTWRIGHT.
JOHN S. POTTER.

Witnesses:
ALBAN ANDRÉN,
ALICE A. PERKINS.